United States Patent [19]

Cliff, Jr.

[11] 4,413,375
[45] Nov. 8, 1983

[54] MEAT PROCESSING APPARATUS

[75] Inventor: John W. Cliff, Jr., Sioux City, Iowa

[73] Assignee: John Morrell & Co., Northfield, Ill.

[21] Appl. No.: 293,110

[22] Filed: Aug. 17, 1981

[51] Int. Cl.³ .............................................. A22C 17/02
[52] U.S. Cl. ......................................... 17/1 R; 17/24; 17/44.3
[58] Field of Search ..................... 17/24, 1 R, 44, 44.3; 269/54.1, 54.4

[56] References Cited

U.S. PATENT DOCUMENTS

| 969,295 | 9/1910 | Meahl . | |
| 1,269,308 | 6/1918 | Reifsnyder et al. . | |
| 1,416,443 | 5/1922 | Brown | 17/24 |
| 1,735,443 | 11/1929 | Randles et al. | 17/24 UX |
| 3,982,299 | 9/1976 | Kompan | 17/1 R |
| 4,128,916 | 12/1978 | Fick, Jr. et al. | 17/52 |

FOREIGN PATENT DOCUMENTS

| 3856 of 1913 | United Kingdom | 269/54.4 |
| 351081 | 6/1931 | United Kingdom | 269/54.4 |

Primary Examiner—Willie G. Abercrombie
Attorney, Agent, or Firm—Wood, Dalton, Phillips, Mason & Rowe

[57] ABSTRACT

Meat processing apparatus having a surface for supporting a body of meat during cutting thereof and a movable hook positioned within an opening in the surface and movable between a raised position to facilitate impaling a body of meat thereon and a lowered position within the opening and generally level with said surface for capturing a portion of the meat between the hook and the edge of the opening to provide a more stable body of meat during cutting and avoid contact between the hook and a knife used by an operator.

10 Claims, 6 Drawing Figures

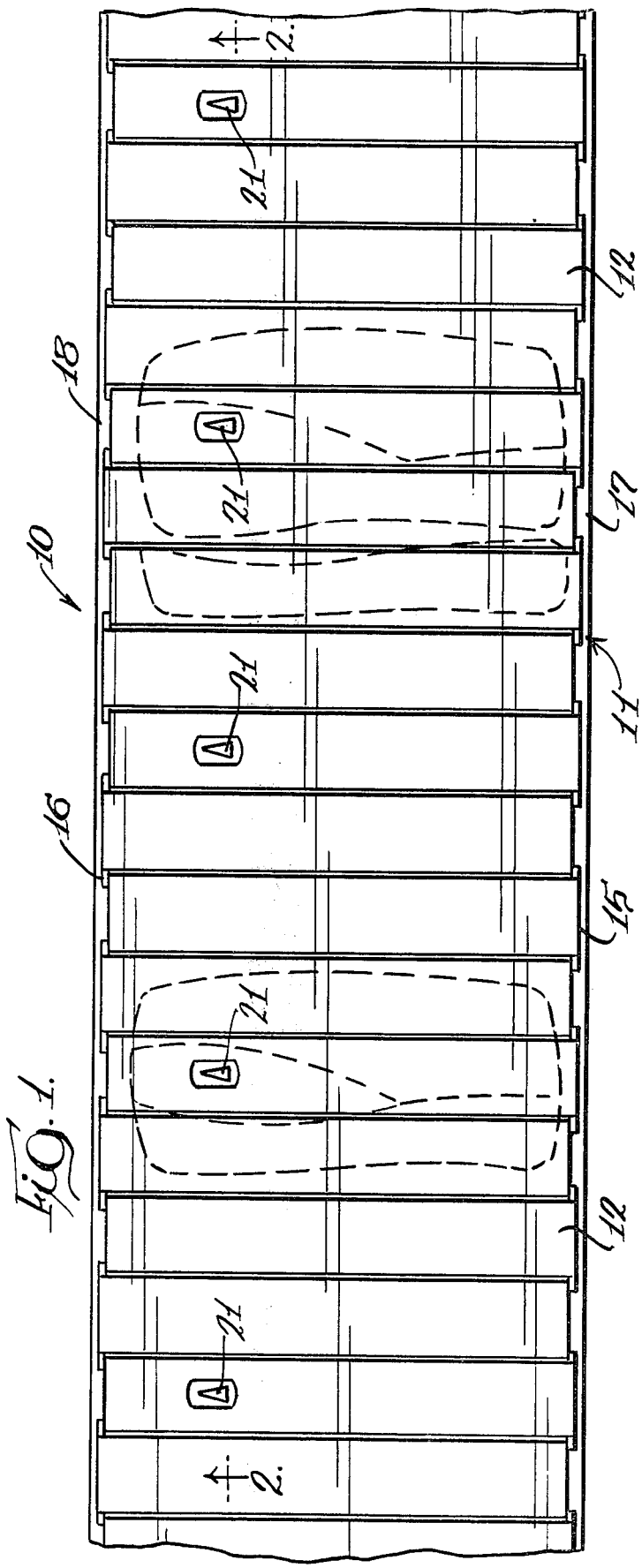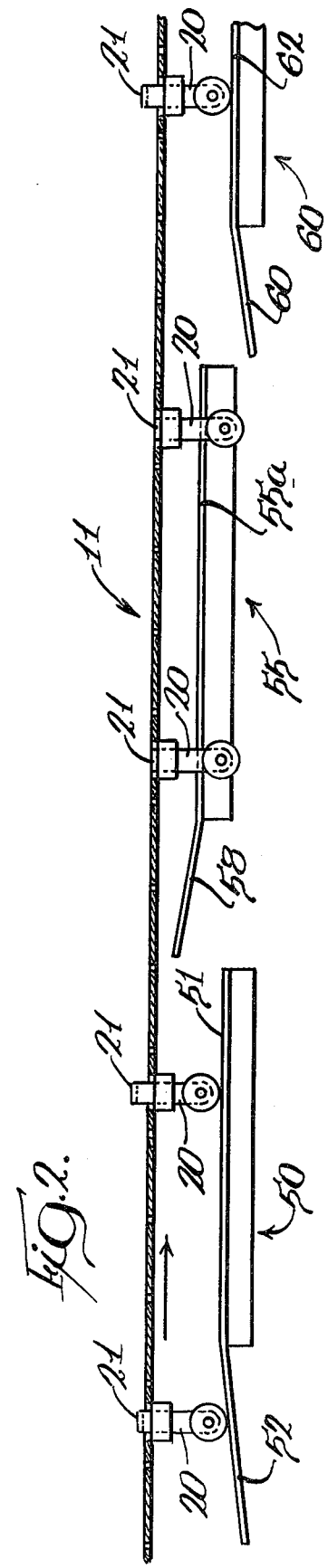

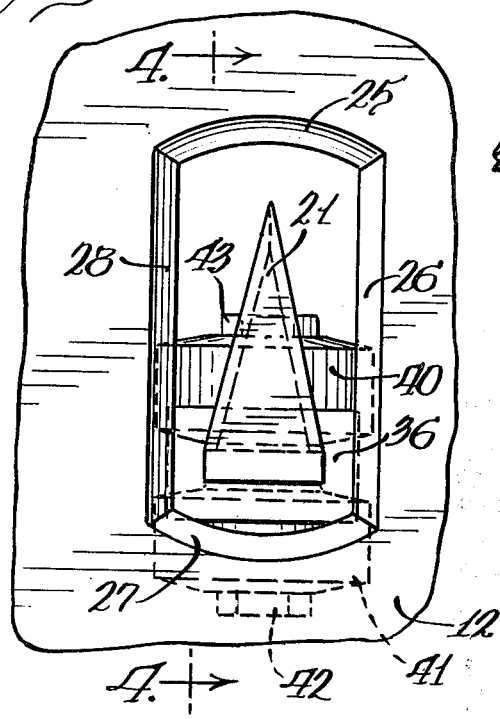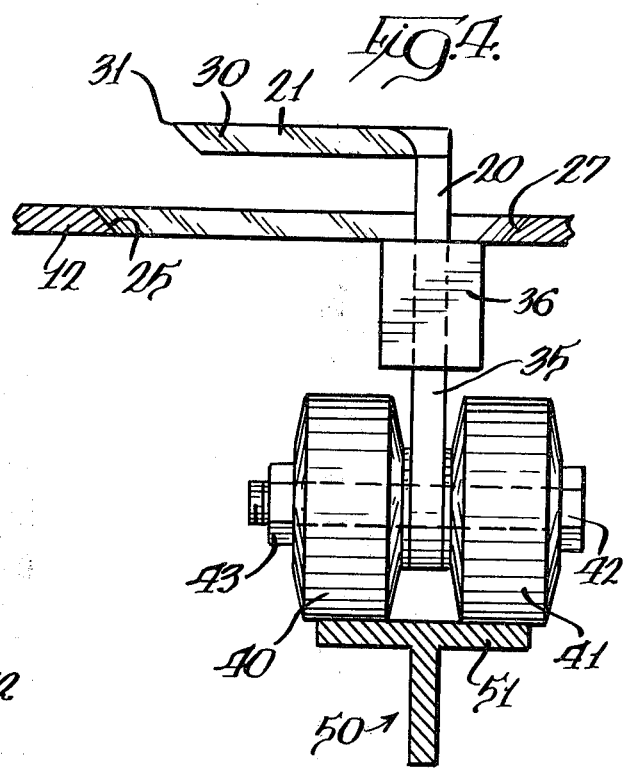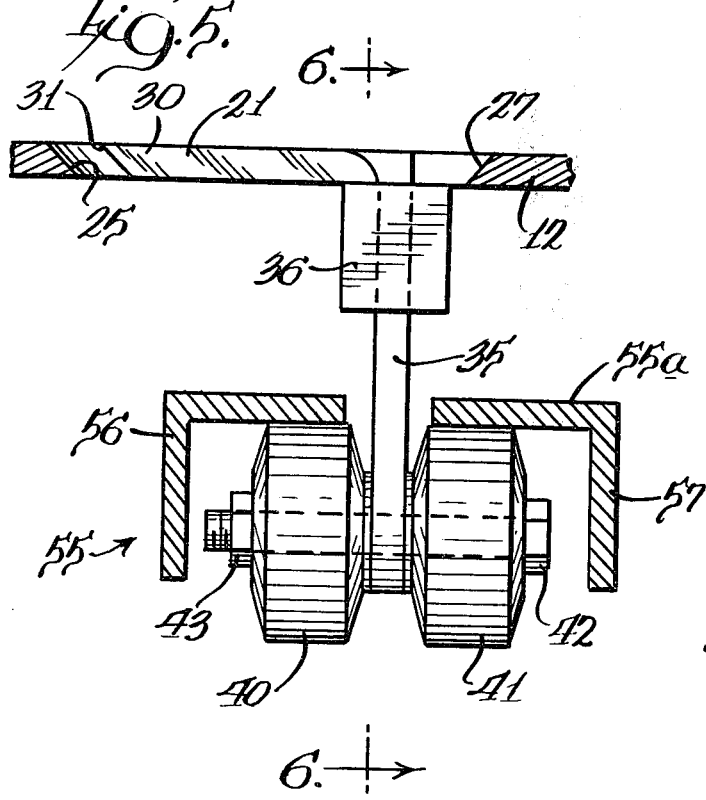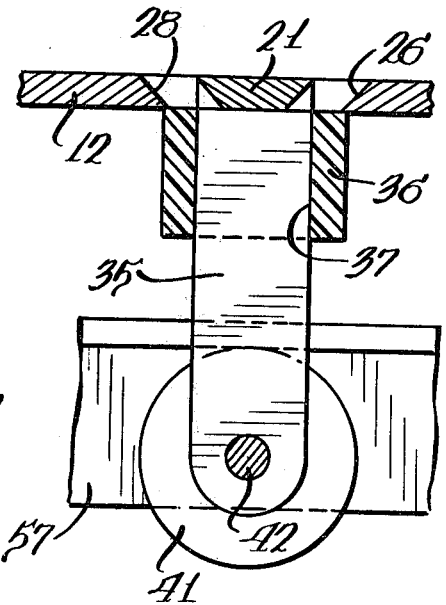

MEAT PROCESSING APPARATUS

BACKGROUND OF THE INVENTION

This invention pertains to meat processing apparatus which enables better handling of a body of meat during cutting of a portion therefrom and, more particularly, to a movable hook upon which a body of meat is impaled and which is movable between a raised position above a supporting surface to facilitate impaling of meat thereon and a lowered position wherein the hook is disposed within an opening in the supporting surface and generally at the level thereof to firmly capture the body of meat and prevent contact of an operator's knife with the hook during removal of a meat portion from the body of meat.

It is known in the prior art to hold a pork belly on a supporting surface, such as a travelling conveyor, by means of a hook to facilitate removal of the pork loins by an operator drawing a knife along the pork loin to sever the loin from the remainder of the pork belly. A specific example of structure of this type is shown in the Fick, Jr. et al U.S. Pat. No. 4,128,916 wherein a conveyor has a series of conveyor slats or panels which are provided with hooks fixed thereto and which protrude above the surface of the conveyor. The fixed hooks merely impale the meat and, thus, do not produce a gripping structure which holds the body of metal firmly in position during cutting thereof. The fixed hook can tear out of the skin of the meat. The protruding hook requires more care by the operator to avoid contact of the cutting knife with the hook and resulting dulling of the knife. Additionally, the cut required in an effort to avoid the hook results in less than maximum desired removal of the pork loin from the remainder of the body of meat.

SUMMARY OF THE INVENTION

A primary feature of the invention disclosed herein is to provide meat processing apparatus utilizing a movable hook movable between a raised position to facilitate impaling of a body of meat thereon and a lowered position wherein the hook coacts with a supporting surface to firmly engage the body of meat. This provides a more stable positioning of the meat enabling more accuracy and precision in the cut performed by the operator. The hook in the lowered position is at the level of the supporting surface, whereby the operator's knife may be moved parallel to the supporting surface when cutting the loin from the meat and without the knife contacting the hook.

An object of the invention is to provide a meat processing apparatus comprising a device with a surface for supporting a body of meat during cutting thereof, and means for holding the meat securely on said surface including an opening in the surface and a hook positioned within the opening and movable between a raised position for impaling of the body of meat thereon and a lowered position within the opening for capturing a portion of the meat between the hook and the edge of the opening.

A further object of the invention is to provide a meat processing apparatus as defined in the preceding paragraph wherein the hook, in lowered position, is generally at the level of the supporting surface in order to avoid any protrusion of the hook above the surface and inadvertent contact thereof by a knife of an operator while cutting the meat.

Another object of the invention is to provide meat processing apparatus having a conveyor movable along a path for carrying a body of meat, such as a pork belly, to and through a work station, a plurality of openings spaced along the length of the conveyor, a plurality of hook members, each having a hook associated one with each of said openings, and the hooks being movable between a raised position above the surface of the conveyor to facilitate impaling of meat thereon and a lowered position within an opening and not protruding above the surface of the conveyor with each of said openings being of a size to provide a space between the hook and edge of the opening when the hook is in lowered position in order to capture a portion of the meat therebetween, and means holding the hooks in raised position at either side of the work station and in lowered position at the work station.

The advantages of the invention include enabling the operator to make a more accurate cut by being able to move the knife parallel to the conveyor or supporting surface when cutting a portion of the meat from the body of meat, such as a pork loin from a pork belly, and with the cut also being more accurate because of the stable holding of the meat on the supporting surface with a firm bond between the meat, the conveyor, and the hook and with the avoidance of any dulling of the knife because of lack of contact between the knife and the movable hook.

BRIEF DESCRIPTION OF THE DRAWINGS

FIG. 1 is a fragmentary plan view of the meat processing apparatus and showing a length of conveyor with bodies of meat positioned thereon shown in broken line;

FIG. 2 is a vertical section, taken generally along the line 2—2 in FIG. 1;

FIG. 3 is a fragmentary plan view, on an enlarged scale, of a portion of the structure shown in FIG. 1 and, more particularly, a hook and surrounding structure;

FIG. 4 is a vertical section, taken generally along the line 4—4 in FIG. 3, with the hook shown in raised position;

FIG. 5 is a view, similar to FIG. 4, showing the hook in lowered position; and

FIG. 6 is a sectional view, taken generally along the line 6—6 in FIG. 5.

DESCRIPTION OF THE PREFERRED EMBODIMENT

The meat processing apparatus is shown generally in FIGS. 1 and 2 wherein a device, such as a conveyor, indicated generally at 10, has an upper surface which travels from left to right, as viewed in the Figure, for carrying a body of meat, such as a pork belly, to and through a work station, indicated generally at 11. The conveyor has a number of slats or panels 12 which, at each end, are connected to links 15 and 16 and which mount rollers (not shown) which are guided in rails 17 and 18 which extend longitudinally of the apparatus. The general structure of the conveyor and the drive means therefor are of a type well known in the art.

A series of panels 12, which are spaced apart from each other, each have a hook member 20 (FIG. 4) associated therewith which is a generally L-shaped member and has a hook 21 defined by one leg of the member.

Referring to FIG. 2, the hooks 21 at the work station 11 are in a lowered position, while the hooks travelling toward the work station are progressively moving to a raised position, as shown for the two hooks at the left side of the Figure. Following the work station, a hook 21 is shown in raised position. The sequence of hook positions, as shown in FIG. 2, provides for raising a hook in advance of the work station to facilitate impaling a body of meat thereon, lowering the hook to hold the meat and avoid contact with an operator's knife at the work station 11 and, thereafter, again raising the hook to permit release of the body of meat.

The specific structure of the hook members, the movable mounting thereof, and association with the conveyor, and means for positioning the hooks is shown particularly in FIGS. 3 to 6. Each of the conveyor panels 12 having a hook associated therewith has means defining an opening which, as shown in FIG. 3, is generally rectangular and has a bevelled edge defined by edge sections 25, 26 and 27, and 28 thereof. The hook 21 is generally triangularly-shaped in plan and tapers to a point and has the underside of its edges bevelled, with one edge being shown at 30, and with an end terminating in a sharp point 31. The opening within the conveyor panel 12 is substantially larger than the hook, as seen in FIG. 3, whereby, when the hook is in lowered position, as viewed in FIGS. 5 and 6, there is a space between the hook and the edge of the opening permitting capture and compression of skin and fat surrounding the hook to, in effect, create a bond to the supporting surface. In actual practice, there is a space of approximately $\frac{1}{8}$" between the hook and the adjacent part of the opening edge.

A second leg 35 of the hook member 20 provides a mounting therefor and is movably guided within a holding block 36 which spans the opening within the conveyor panel and extends slightly beyond the edge of the opening for attachment to the underside of the conveyor panel by suitable means, such as welding. As seen in FIG. 6, the holding block 36 has an internal opening 37 in which the hook member second leg 35 is movable to permit movement of a hook 21 between the raised position, shown in FIG. 4 above the supporting surface, and a lowered position, shown in FIGS. 5 and 6, wherein the hook is at the level of the supporting surface.

Each hook member has a cam follower associated therewith in the form of a pair of rollers 40 and 41 mounted rotatably on a shaft, such as a bolt 42, which extends therethrough and which also extends through an opening in the hook member leg 35. The parts are held in assembled relation by a nut 43 threaded onto the bolt.

The cam followers coact with cam tracks which are shown particularly in FIGS. 2 and 4 to 6. A first cam track, indicated generally at 50, is located in advance of the work station and is formed of suitable material, such as a steel member having a flat, relatively wide surface 51 having a lead-in inclined section 52. As a hook approaches the lead-in section 52, it is in a unsupported position with the hook in its lowered position due to gravity. Upon contact of the cam follower rollers 40 and 41 with the lead-in section 52, the hook member gradually rises to the level of the surface 51 of the cam track and the hook 21 is in fully-raised position facilitating impaling of a body of meat thereon.

A second cam track is indicated generally at 55 and is formed as a pair of angle irons 56 and 57, shown particularly in FIG. 5. These angle irons each have lead-in sections 58 (FIG. 2) which are inclined downwardly toward the level of a main section 55a of the cam track 55 whereby the cam follower, travelling toward the right as viewed in FIG. 2, will have the rollers thereof move under the downwardly-inclined lead-in section 58, after leaving the cam track 50, to move the cam follower rollers downwardly to the level of the main section 55a of the cam track 55. At this level, the hooks 21 are firmly held in lowered position at the level of the conveyor surface.

A third cam track, indicated generally at 60, is of the same construction as the cam track 50 having an upwardly-inclined lead-in section 61 for forcing the hooks 21 upwardly as they leave the work station and the cam track 55 and the hooks being maintained in the upper position by the main section 62 of the cam track to enable release of the remainder of the body of meat from the conveyor. After termination of the cam track 60, the cam followers and hooks are free to move downwardly until, on the return thereof to the cam track 50, they are again raised. Cam tracks 50, 55, and 60 can be suitably supported from the framework which mounts the conveyor, as by transverse members secured thereto and which extend to framework at the front and rear of the conveyor frame.

With the structure disclosed herein, the movable hooks each positioned in spaced relation to the surrounding openings in the supporting surface, such as the conveyor panels, enables compression of surrounding skin and fat between the hook and edge of the opening when the hook is in lowered position to provide a more stable holding of the meat, adding to the accuracy and precision of the cut. With the hook at the level of the conveyor surface, the operator can move his knife parallel to the conveyor surface when pulling or cutting a portion of the meat, such as a pork loin, from a pork belly and with avoidance of contact between the knife and the hook.

I claim:

1. Meat processing apparatus comprising, a device with a surface for supporting a body of meat during cutting thereof, and means for holding said meat securely on said surface including an opening in said surface, and a hook positioned within said opening, means mounting the hook for movement between a raised position above the opening for impaling of a body of meat thereon and a lowered position within the opening and not above the top of the surface, said opening having an area greater than said hook whereby the edge of the opening is at a distance from the perimeter of the hook when the hook is in said lowered position to provide a space whereby a portion of the meat is captured between the hook and the edge of said opening.

2. Meat processing apparatus as defined in claim 1 including means for holding said hook in either of said raised and lowered positions.

3. Meat processing apparatus as defined in claim 1 wherein the lower side of said hook is bevelled and the edge of the opening has a bevel of the same inclination as that of the hook.

4. Meat processing apparatus, comprising, a conveyor movable along a path for carrying a body of meat to and through a work station, a hook mounted for travel with the conveyor and engageable with said body of meat to cause said meat to travel with the conveyor, and means mounting said hook for movement between a raised meat-impaling position above the surface of the conveyor and a lowered position generally in the plane of the top surface of the conveyor for firmly holding the meat on the conveyor and avoiding protrusion of the hook above the surface of the conveyor.

5. Meat processing apparatus as defined in claim 4 including means for holding said hook in the raised position at either side of said work station and for holding said hook in the lowered position at the work station.

6. Apparatus as defined in claim 5 wherein said hook-holding means includes cam members having a length in the direction of conveyor travel and a cam follower associated with said hook.

7. Apparatus as defined in claim 4 wherein said hook is a generally L-shaped member, a guide block secured to the undeside of the conveyor and movably receiving one leg of the hook to guide the hook in raising and lowering movement thereof.

8. Apparatus as defined in claim 4 wherein there are a plurality of said hooks spaced apart lengthwise of said conveyor, and means for controlling successive hooks to have each hook in lowered position at the work station and in the raised position at either side of the work station.

9. Meat processing apparatus as defined in claim 4 wherein said conveyor surface has an opening larger than the hook whereby the hook is within said opening when in lowered position and at a distance from the edge of the opening to provide a space for portions of the body of meat captured therebetween.

10. Meat processing apparatus comprising, a conveyor movable along a path for carrying a body of meat to and through a work station, a plurality of openings spaced along the length of the conveyor, a plurality of hook members having a hook associated one with each of said openings, said hooks being movable between a raised position above the surface of the conveyor to facilitate impaling of meat thereon and a lowered position within an opening and not protruding above the surface of the conveyor, each of said openings being of a size to provide a space between the hook and edge of the opening when the hook is in lowered position in order to capture a portion of the meat therebetween, and means holding the hooks in raised position at either side of the work station and in lowered position at the work station including a cam follower on each hook member below the conveyor surface, cam tracks at both sides of the work station on which a cam follower rests to hold a hook in raised position, and a cam track at the work station engageable with a cam follower to pull a hook member to lowered position and hold the cam follower and hook member in lowered position.

* * * * *